United States Patent
Ward-Karet et al.

(10) Patent No.: US 9,294,377 B2
(45) Date of Patent: Mar. 22, 2016

(54) CONTENT-BASED USER INTERFACE, APPARATUS AND METHOD

(75) Inventors: Jesse Ward-Karet, San Francisco, CA (US); Peter Benjamin Loer, Oakland, CA (US); Christopher Jacob Loer, San Francisco, CA (US); Jeremy Scott Spiegel, San Francisco, CA (US); Aaron Olaf Louick Bauer, Albany, CA (US); Brian Patrick Green, Oakland, CA (US); John Edward Firebaugh, San Francisco, CA (US); Michael Latham Ottum, San Francisco, CA (US); Anna Esther Min, Emeryville, CA (US)

(73) Assignee: International Business Machines Corporation, Armonk, NY (US)

( * ) Notice: Subject to any disclaimer, the term of this patent is extended or adjusted under 35 U.S.C. 154(b) by 267 days.

(21) Appl. No.: 12/882,023

(22) Filed: Sep. 14, 2010

(65) Prior Publication Data

US 2011/0066951 A1 Mar. 17, 2011
US 2014/0223324 A9 Aug. 7, 2014

Related U.S. Application Data

(63) Continuation-in-part of application No. 12/142,723, filed on Jun. 19, 2008, now Pat. No. 8,055,617, which is a continuation of application No. 10/804,799, filed on Mar. 19, 2004, now Pat. No. 7,398,272.

(60) Provisional application No. 61/242,278, filed on Sep. 14, 2009.

(51) Int. Cl.
*H04L 12/26* (2006.01)
*H04L 12/825* (2013.01)

(52) U.S. Cl.
CPC .......... *H04L 43/0894* (2013.01); *H04L 43/106* (2013.01); *H04L 47/25* (2013.01)

(58) Field of Classification Search
USPC ........................................................ 715/744
See application file for complete search history.

(56) References Cited

U.S. PATENT DOCUMENTS

| | | |
|---|---|---|
| 5,010,571 A | 4/1991 | Katznelson et al. |
| 5,586,304 A | 12/1996 | Stupek, Jr. et al. |

(Continued)

FOREIGN PATENT DOCUMENTS

| | | |
|---|---|---|
| JP | 2001318814 | 11/2001 |
| JP | 2002523841 | 7/2002 |

(Continued)

OTHER PUBLICATIONS

APT Team, "Main Page of APT-GET", http://web.archive.org/web/20041027155110/http://linuxreviews.org/man/apt-get; Viewed Online Jul. 11, 2012, Mar. 12, 2001, pp. 1-12.

(Continued)

*Primary Examiner* — Hien Duong
(74) *Attorney, Agent, or Firm* — Stephen R. Ikacs; Stephen J. Walder, Jr.; Joseph Petrokaitis

(57) ABSTRACT

A Policy- and Relevance-based User Interface (UI) for an enterprise suite Console provides a Console Operator access to information about systems on a network under management. By means of such UI, a user experience is dynamically constructed within product domains particular to the system under management using content elements that flow from content sites into the user environment, populating user interface and driving the Operator experience. Specifications distributed with the content determine how the local Console UI organizes and presents information. The UI is further determined by each Console operator's content access rights. The UI allows for re-flowing the Console UI without reinstalling or updating the Console application, seamlessly integrating new content in to the UI and targeting language to specific working areas.

30 Claims, 10 Drawing Sheets

(56) References Cited

U.S. PATENT DOCUMENTS

| | | |
|---|---|---|
| 5,649,099 A | 7/1997 | Theimer et al. |
| 5,732,137 A | 3/1998 | Aziz |
| 5,751,967 A | 5/1998 | Raab et al. |
| 5,958,050 A | 9/1999 | Griffin et al. |
| 6,123,737 A | 9/2000 | Sadowsky |
| 6,128,738 A | 10/2000 | Doyle et al. |
| 6,151,643 A | 11/2000 | Cheng et al. |
| 6,161,218 A | 12/2000 | Taylor |
| 6,192,404 B1 | 2/2001 | Hurst et al. |
| 6,233,612 B1 | 5/2001 | Fruchtman et al. |
| 6,237,144 B1 | 5/2001 | Delo |
| 6,240,394 B1 | 5/2001 | Uecker et al. |
| 6,240,451 B1 | 5/2001 | Campbell et al. |
| 6,256,664 B1 | 7/2001 | Donoho et al. |
| 6,256,668 B1 | 7/2001 | Silvka et al. |
| 6,263,362 B1 | 7/2001 | Donoho et al. |
| 6,289,394 B1 | 9/2001 | Kozuka |
| 6,289,510 B1 | 9/2001 | Nakajima |
| 6,321,258 B1 | 11/2001 | Stolfus et al. |
| 6,324,691 B1 | 11/2001 | Gazdik |
| 6,324,693 B1 | 11/2001 | Brodersen et al. |
| 6,327,617 B1 | 12/2001 | Fawcett |
| 6,330,715 B1 | 12/2001 | Razzaghe-Ashrefi |
| 6,345,386 B1 | 2/2002 | Dolo |
| 6,347,396 B1 | 2/2002 | Gard |
| 6,347,398 B1 | 2/2002 | Parthesarathy et al. |
| 6,351,536 B1 | 2/2002 | Sasaki et al. |
| 6,353,902 B1 | 3/2002 | Kultaungge et al. |
| 6,353,926 B1 | 3/2002 | Parthasarathy |
| 6,353,928 B1 | 3/2002 | Atberg et al. |
| 6,356,936 B1 | 3/2002 | Donoho et al. |
| 6,360,366 B1 | 3/2002 | Heath et al. |
| 6,363,524 B1 | 3/2002 | Loy |
| 6,378,128 B1 | 4/2002 | Edelstein et al. |
| 6,381,742 B2 | 4/2002 | Forbes et al. |
| 6,389,464 B1 | 5/2002 | Krishnamurthy et al. |
| 6,389,589 B1 | 5/2002 | Mishra et al. |
| 6,405,250 B1 | 6/2002 | Lin et al. |
| 6,407,988 B1 | 6/2002 | Agraharam et al. |
| 6,418,478 B1 | 7/2002 | Ignatius et al. |
| 6,418,554 B1 | 7/2002 | Dolo et al. |
| 6,434,606 B1 | 8/2002 | Borella et al. |
| 6,449,642 B2 | 9/2002 | Bourke-Dunphy et al. |
| 6,460,175 B1 | 10/2002 | Ferr et al. |
| 6,477,703 B1 | 11/2002 | Smith et al. |
| 6,487,603 B1 | 11/2002 | Schuster et al. |
| 6,493,594 B1 | 12/2002 | Krami |
| 6,496,977 B1 | 12/2002 | Hamilton, II et al. |
| 6,516,316 B1 | 2/2003 | Ramasubramani et al. |
| 6,523,166 B1 | 2/2003 | Mishra et al. |
| 6,526,507 B1 | 2/2003 | Cromer et al. |
| 6,532,491 B1 | 3/2003 | Lakis et al. |
| 6,535,977 B1 | 3/2003 | Holle et al. |
| 6,557,054 B2 | 4/2003 | Reisman |
| 6,564,369 B1 | 5/2003 | Hove et al. |
| 6,571,186 B1 | 5/2003 | Ward |
| 6,574,537 B2 | 6/2003 | Kipersztok et al. |
| 6,594,692 B1 | 7/2003 | Reisman |
| 6,594,759 B1 | 7/2003 | Wong |
| 6,604,130 B2 | 8/2003 | Donoho et al. |
| 6,611,862 B2 | 8/2003 | Reisman |
| 6,622,146 B1 | 9/2003 | Sato et al. |
| 6,654,714 B1 | 11/2003 | Gentile et al. |
| 6,658,464 B2 | 12/2003 | Reisman |
| 6,658,489 B1 | 12/2003 | Asselin |
| 6,678,889 B1 * | 1/2004 | Burkett .................. G06F 9/4443 707/999.1 |
| 6,681,243 B1 | 1/2004 | Putzolu et al. |
| 6,725,242 B2 | 4/2004 | Gardner |
| 6,725,452 B1 | 4/2004 | Te'eni et al. |
| 6,735,766 B1 | 5/2004 | Chamberlain et al. |
| 6,745,224 B1 | 6/2004 | D'Souza et al. |
| 6,745,766 B2 | 6/2004 | Fini |
| 6,751,661 B1 | 6/2004 | Geddes et al. |
| 6,763,517 B2 | 7/2004 | Hines |
| 6,769,009 B1 | 7/2004 | Reisman |
| 6,789,255 B1 | 9/2004 | Pedrizetti et al. |
| 6,802,061 B1 | 10/2004 | Parthasarathy et al. |
| 6,804,663 B1 | 10/2004 | Dolo |
| 6,836,794 B1 | 12/2004 | Lucovsky et al. |
| 6,851,115 B1 | 2/2005 | Cheyer et al. |
| 6,871,281 B2 | 3/2005 | Schwab et al. |
| 6,904,457 B2 | 6/2005 | Goodman |
| 6,920,631 B2 | 7/2005 | Dolo |
| 6,922,831 B1 | 7/2005 | Kroening et al. |
| 6,931,434 B1 | 8/2005 | Donoho et al. |
| 6,941,453 B2 | 9/2005 | Rao |
| 6,954,790 B2 | 10/2005 | Forslow et al. |
| 6,971,094 B1 | 11/2005 | Ly |
| 6,996,815 B2 | 2/2006 | Bourke-Dunphy et al. |
| 6,996,819 B1 | 2/2006 | Alanis |
| 7,134,019 B2 | 11/2006 | Shelest et al. |
| 7,137,040 B2 | 11/2006 | Bae et al. |
| 7,171,479 B2 | 1/2007 | Buchanan et al. |
| 7,185,229 B2 | 2/2007 | Cromer et al. |
| 7,275,048 B2 | 9/2007 | Bigus et al. |
| 7,277,919 B1 | 10/2007 | Donoho et al. |
| 7,333,517 B2 | 2/2008 | Madhavapeddi et al. |
| 7,398,272 B2 | 7/2008 | Hindawi et al. |
| 7,509,377 B2 | 3/2009 | Harvey et al. |
| 7,523,190 B1 | 4/2009 | Bickerstaff et al. |
| 7,558,953 B2 | 7/2009 | Osthoff et al. |
| 7,577,097 B2 | 8/2009 | Tan |
| 7,586,848 B1 | 9/2009 | Gunduzhan |
| 7,620,816 B1 | 11/2009 | Vigue et al. |
| 7,630,401 B2 | 12/2009 | Iwamura |
| 7,668,938 B1 | 2/2010 | Phillips et al. |
| 7,787,379 B2 | 8/2010 | Mekkattuparamban et al. |
| 7,830,816 B1 | 11/2010 | Gonzalez et al. |
| 7,953,113 B2 | 5/2011 | Elliot et al. |
| 7,962,632 B2 | 6/2011 | Lipsanen |
| 7,969,900 B2 | 6/2011 | Abdo et al. |
| 8,055,617 B2 | 11/2011 | Hindawi et al. |
| 8,161,149 B2 | 4/2012 | Lippincott et al. |
| 8,165,088 B2 | 4/2012 | Oba |
| 8,171,364 B2 | 5/2012 | Veillette et al. |
| 8,315,262 B2 | 11/2012 | Toscano |
| 8,495,157 B2 | 7/2013 | Goodrow et al. |
| 8,543,682 B2 | 9/2013 | Menon |
| 8,660,006 B2 | 2/2014 | Torres et al. |
| 2001/0032091 A1 | 10/2001 | Schultz et al. |
| 2001/0042104 A1 | 11/2001 | Donoho et al. |
| 2002/0112200 A1 | 8/2002 | Hines |
| 2002/0143949 A1 * | 10/2002 | Rajarajan ............... G06F 9/4443 709/226 |
| 2002/0147764 A1 | 10/2002 | Krupczak |
| 2002/0152384 A1 | 10/2002 | Shelest et al. |
| 2002/0188691 A1 | 12/2002 | Ignatius et al. |
| 2003/0033394 A1 | 2/2003 | Stine |
| 2003/0033396 A1 | 2/2003 | McCall |
| 2003/0033400 A1 | 2/2003 | Pawar et al. |
| 2003/0041167 A1 | 2/2003 | French et al. |
| 2003/0074321 A1 | 4/2003 | Peled |
| 2003/0074358 A1 | 4/2003 | Sarbaz et al. |
| 2003/0088542 A1 | 5/2003 | McGee et al. |
| 2003/0097454 A1 | 5/2003 | Yamakawa et al. |
| 2003/0126256 A1 | 7/2003 | Cruickshank et al. |
| 2003/0177179 A1 | 9/2003 | Jones et al. |
| 2003/0187868 A1 | 10/2003 | Igarashi |
| 2003/0202480 A1 | 10/2003 | Swami |
| 2003/0233645 A1 | 12/2003 | Cohen et al. |
| 2003/0233646 A1 | 12/2003 | Cohen et al. |
| 2004/0039816 A1 | 2/2004 | Bae et al. |
| 2004/0117275 A1 | 6/2004 | Billera |
| 2004/0174904 A1 | 9/2004 | Kim et al. |
| 2004/0187105 A1 | 9/2004 | Inada et al. |
| 2004/0213211 A1 | 10/2004 | Green et al. |
| 2004/0215781 A1 | 10/2004 | Pulsipher et al. |
| 2004/0223505 A1 | 11/2004 | Kim et al. |
| 2004/0230644 A1 | 11/2004 | Aratake et al. |
| 2004/0230854 A1 | 11/2004 | Elko et al. |
| 2004/0246975 A1 | 12/2004 | Joshi et al. |
| 2004/0255048 A1 | 12/2004 | Lev Ran et al. |
| 2004/0260949 A1 | 12/2004 | Aoki et al. |

(56) References Cited

U.S. PATENT DOCUMENTS

| | | | |
|---|---|---|---|
| 2005/0002408 A1 | 1/2005 | Lee et al. | |
| 2005/0005026 A1 | 1/2005 | Brown et al. | |
| 2005/0047343 A1 | 3/2005 | Sharony et al. | |
| 2005/0054327 A1 | 3/2005 | Johnston et al. | |
| 2005/0081156 A1* | 4/2005 | Clark et al. | 715/736 |
| 2005/0086477 A1 | 4/2005 | Lin et al. | |
| 2005/0086534 A1* | 4/2005 | Hindawi et al. | 713/201 |
| 2005/0091501 A1 | 4/2005 | Osthoff et al. | |
| 2005/0120160 A1 | 6/2005 | Plouffe et al. | |
| 2005/0180326 A1 | 8/2005 | Goldflam et al. | |
| 2005/0198201 A1* | 9/2005 | Bohn | H04L 12/6418 709/218 |
| 2006/0095388 A1 | 5/2006 | Brown et al. | |
| 2006/0104370 A1 | 5/2006 | Yamanaka | |
| 2006/0168291 A1 | 7/2006 | Van Zoest et al. | |
| 2006/0253446 A1 | 11/2006 | Leong et al. | |
| 2006/0268713 A1 | 11/2006 | Lundstrom et al. | |
| 2007/0019552 A1 | 1/2007 | Senarath | |
| 2007/0050645 A1 | 3/2007 | Siegmund et al. | |
| 2007/0070890 A1 | 3/2007 | Rojahn | |
| 2007/0091921 A1 | 4/2007 | Elliot et al. | |
| 2007/0115814 A1 | 5/2007 | Gerla et al. | |
| 2007/0121511 A1 | 5/2007 | Morandin | |
| 2007/0124412 A1 | 5/2007 | Narayanaswami et al. | |
| 2007/0147435 A1 | 6/2007 | Hamilton et al. | |
| 2007/0180119 A1 | 8/2007 | Khivesara et al. | |
| 2007/0204078 A1 | 8/2007 | Boccon-Gibod et al. | |
| 2007/0280253 A1 | 12/2007 | Rooholamini et al. | |
| 2007/0288914 A1 | 12/2007 | Brannock et al. | |
| 2008/0016335 A1 | 1/2008 | Takahashi et al. | |
| 2008/0052054 A1* | 2/2008 | Beverina et al. | 703/6 |
| 2008/0144493 A1 | 6/2008 | Yeh | |
| 2008/0192695 A1 | 8/2008 | Krishnan et al. | |
| 2008/0201462 A1 | 8/2008 | Liss et al. | |
| 2008/0240156 A1 | 10/2008 | Elliot et al. | |
| 2008/0263218 A1 | 10/2008 | Beerends et al. | |
| 2008/0295092 A1* | 11/2008 | Tan et al. | 717/178 |
| 2009/0019525 A1 | 1/2009 | Yu et al. | |
| 2009/0147737 A1 | 6/2009 | Tacconi et al. | |
| 2009/0147806 A1 | 6/2009 | Bruckheimer | |
| 2009/0222555 A1 | 9/2009 | Qian et al. | |
| 2009/0232017 A1 | 9/2009 | Carlisle | |
| 2009/0232159 A1 | 9/2009 | Haran et al. | |
| 2009/0276771 A1* | 11/2009 | Nickolov et al. | 717/177 |
| 2010/0017494 A1 | 1/2010 | Hindawi et al. | |
| 2010/0088411 A1 | 4/2010 | Litofsky et al. | |
| 2010/0150009 A1 | 6/2010 | Mangs et al. | |
| 2010/0228947 A1 | 9/2010 | Sasao et al. | |
| 2010/0250682 A1 | 9/2010 | Goldberg et al. | |
| 2010/0250769 A1 | 9/2010 | Barreto et al. | |
| 2010/0332640 A1 | 12/2010 | Goodrow et al. | |
| 2011/0029626 A1 | 2/2011 | Goodrow et al. | |
| 2011/0066752 A1 | 3/2011 | Lippincott et al. | |
| 2011/0066841 A1 | 3/2011 | Goodrow et al. | |
| 2011/0116390 A1 | 5/2011 | Ramachandran et al. | |
| 2011/0222691 A1 | 9/2011 | Yamaguchi et al. | |
| 2011/0276688 A1 | 11/2011 | Qian et al. | |
| 2012/0203818 A1 | 8/2012 | Lippincott et al. | |
| 2012/0226805 A1 | 9/2012 | Rojahn | |
| 2012/0310890 A1 | 12/2012 | Dodd et al. | |
| 2012/0324519 A1 | 12/2012 | Laughlin | |

FOREIGN PATENT DOCUMENTS

| | | |
|---|---|---|
| JP | 2002247033 | 8/2002 |
| JP | 200376434 | 3/2003 |
| WO | WO03040944 | 5/2003 |

OTHER PUBLICATIONS

Arnaud, et al., "How to Disable Security Warning Popup About Message Containing Script", http://forum.bigfix.com/viewtopic.php?id=1519; Accessed Online Jul. 12, 2012, Nov. 15, 2007, 2 Pages.

BigFix, "New Features in BES 4.0", Available online: http://web.archive.org/web/20061026095436/http://support.bigfix.com/bes/changes_4_0.html, Oct. 26, 2006, 1 Page.

BigFix, Inc., "BES Console Context Menu Wake-on LAN", http://web.archive.org/web/20061026092909/http://support.bigfix.com/bes/misc/bes-wol.html; Archived Oct. 26, 2006, 1 page.

BigFix, Inc., "BigFix Action Language Reference: A Guide to the BigFix Action Shell Commands for the BigFix Enterprise Suite (BES)", BigFix, Inc. Emeryville, CA. Compatible with BES Version 6.0, Dec. 6, 2006, 59 Pages.

BigFix, Inc., "BigFix Client ICMP Traffic Technical Details", http://support.bigfix.com/bes/misc/besclient_icmp.html; Version 5.1, 6.0. Accessed online Jun. 16, 2012, copyright 2011, pp. 1-5.

BigFix, Inc., "BigFix Enterprise Suite (BES) Administrator's Guide", BigFix, Inc. Emeryville, CA. Version 7.1, Jul. 25, 2008, 108 Pages.

BigFix, Inc., "BigFix Enterprise Suite (BES) Console Operator's Guide", BigFix, Inc. Emeryville, CA. Version 7.1; last modified Jul. 26, 2008, copyright 2008, 182 Pages.

BigFix, Inc., "BigFix Remote Desktop for Windows", Version 1.0. http://support.bigfix.com/product/documents/BigFixRemoteDesktopGuide-v1.pdf. Viewed online Jul. 11, 2012., Sep. 13, 2007, 13 pages.

BigFix, Inc., "Wake on LAN With a Alteration", http://forum.bigfix.com/viewtopic.php?id=3248; Viewed online Jul. 11, 2012., May 14, 2009, 3 pages.

Burrows, Daniel, "Modelling and Resolving Software Dependencies", Jun. 15, 2005, pp. 1-16.

Cisco Systems, Inc., "Configuring the Cisco IOS DHCP Relay Agent", Cisco Systems, Inc. 170 West Tasman Drive, San Jose, CA 95134-1706, USA. First Published May 2, 2005, Nov. 17, 2006, 26 Pages.

Cstoneba, "BES Deployment—Wake on Lan", retrieved on Aug. 1, 2012 online from url: http://forum.bigfix.com/viewtopic.php?pid=12542, Apr. 29, 2009, 4 pages.

Firstbrook, Peter et al., "Magic Quadrant for Endpoint Protection Platforms", Gartner, Inc., Dec. 21, 2007, pp. 1-16.

Held, G et al., "The Internet Protocol and Related Protocols: Chapter 4", The ABCs of TCP/IP. Auerbach Publications., 2002, 56 Pages.

Johnson, David B., et al., "DSR: The Dynamic Source Routing Protocol for Multi-Hop Wireless Ad Hoc Networks", http://www.monarch.cs.cmu.edu; Computer Science Department. Carnegie Mellon University, Pittsburgh, PA 15213-3891, 2001, pp. 1-25.

Jreinec, et al., "Using a DOS Variable in Action Script", http://forum.bigfix.com/viewtopic.php?id=1867; Accessed online Jul. 12, 2012, Mar. 24, 2008, 1 Page.

Kessler, G. et al., "An Overview of Cryptographic Methods", Network Design: Principles and Applications. Edited by Gilbert Held. Auerbach Publications., 2000, pp. 679-691.

Knuth, Donald E., "The Art of Computer Programming", Second Edition. vol. 3: Sorting and Searching. Addison Wesley Longman Publishing Co., Inc., Mar. 1998, 39 Pages.

Kus, Ben et al., "BigFix 7.1 Released", http://forum.bigfix.com/viewtopic.php?id=2258; Viewed Online Jul. 11, 2012., Aug. 5, 2008, 2 pages.

Leach, Paul J. et al., "CIFS/E Browser Protocol", Microsoft Internet Engineering Task Force. Network Working Group, Internet Draft., Jan. 10, 1997, pp. 1-24.

Menezes, P. et al., "Chapter 8: Public-Key Encryption", Handbook of Applied Cryptography. CRC Press., 1996, 37 Pages.

Mgoodnow, "Relay on the DMZ", http://forum.bigfix.com/viewtopic.php?id=428; Accessed Online Jul. 23, 2012, Nov. 30, 2006, 6 Pages.

Nholmes, et al., "BES Automatic Relay Settings", http://forum.bigfix.xom/viewtopic.php?id=182; Accessed Online Jul. 11, 2012., Sep. 18, 2006, pp. 1-4.

OWASP, "Positive Security Model", Open Web Application Security Project (OWASP). http://web.archive.org/web/20060821235729/http://www.owasp.org/index.php/Positive_security_model, Aug. 21, 2006, 2 Pages.

Tang, Hong et al., "Self-Organizing Networks of Communications and Computing", International Transactions on Systems Science and Applications, vol. 1, No. 4., Nov. 6, 2006, pp. 421-431.

(56) References Cited

OTHER PUBLICATIONS

Tipton, H. et al., "Information Security Management Handbook: 2006 Edition", Auerbach Publications. Glossary., 2006, 179 Pages.

Todorov, Dobromir, "Chapter 1: User Identification and Authentication Concepts", From the book: Mechanics of User Identification and Authentication: Fundamentals of Identity Management. Auerbach Publications. Takir & Francis Group, LLC., 2007, pp. 1-64.

U.S. Department of Commerce, "Entity Authentication Using Public Key Cryptography", National Institute of Standards and Technology. Federal Information Processing Standards Publication. FIPS PUB 196., Feb. 18, 1997, 52 Pages.

Final Office Action dated Jul. 17, 2013 for U.S. Appl. No. 12/881,995; 71 pages.

Office Action mailed Aug. 8, 2013 for U.S. Appl. No. 12/878,881; 25 pages.

USPTO U.S. Appl. No. 12/878,881, Aug. 2, 2013, 2 pages.
USPTO U.S. Appl. No. 12/881,668, Aug. 26, 2013, 2 pages.
USPTO U.S. Appl. No. 12/881,995, Aug. 2, 2013, 3 pages.
USPTO U.S. Appl. No. 12/882,106, Aug. 26, 2013, 3 pages.

"1E WakeUp", Published by 1E, Archived Jul. 24, 2008, Available online: http://web.archive.org/web/20080724185718/http://www.1e.com/SoftwareProducts/1EWakeUp/faq.aspx, 10 pages.

"Last Man Standing", IBM, http://www-01.ibm.com/support/docview.wss?uid=swg21506077; Accessed online Sep. 17, 2013, 3 pages.

Sherif, Mostafa H., "Algorithms and Architectures for Security", Chapter 3, Published in "Protocols for Secure Electronic Commerce, Second Edition", CRC Press: Sep. 2004, 101 pages.

Response to Office Action filed Nov. 8, 2013, U.S. Appl. No. 12/878,881, 12 pages.

\* cited by examiner

CONTENT-BASED USER INTERFACE, APPARATUS AND METHOD

CROSS REFERENCE TO RELATED APPLICATIONS

This is application is a continuation-in-part U.S. patent application Ser. No. 12/142,723, filed Jun. 19, 2008, now U.S. Pat. No. 8,055,617 issued Jun. 8, 2011, which is a continuation of U.S. patent application Ser. No. 10/804,799, filed Mar. 19,2004, now U.S. Pat. No. 7,398,272, issued Jul, 8, 2008, the entirety of which is incorporated herein by this reference thereto; this application claims benefit of U.S. provisional patent application No. 61/242,278, filed Sep. 14, 2009, the entirety which is incorporated herein by this reference thereto.

BACKGROUND OF THE INVENTION

1. Field of the Invention

The present invention relates to customizing a user interface to a current user and a current task. More particularly, the present invention relates to a method and apparatus for dynamically updating a content-based user interface.

2. Background Discussion

Conventionally, software user interfaces are only modified with great difficulty. For example, modifying user interfaces to desktop applications, such as word processors, may require that large portions of the application source code be rewritten. After the source code is rewritten, new object code and machine code must be generated. Following that, the new version of the software must be distributed to the user base. Additionally, because the user interface (UI) cannot be readily modified, users must devise and use workarounds for them, at least until a patch can be distributed or, possibly, until a new release of the software. In dynamic environments, such as unified network management platforms, the profusion of tasks, roles, types and sources of content and environment render the overall task of management of the environment extremely burdensome with a conventional static UI.

SUMMARY

A Policy- and Relevance-based User Interface (UI) for an enterprise suite Console provides a Console Operator access to information about systems on a network under management. By means of such UI, a user experience is dynamically constructed within product domains particular to the system under management using content elements that flow from content sites into the Operator environment, populating the UI and driving the Operator experience. Specifications distributed with the content determine how the local Console UI organizes and presents information. The UI is further determined by each Console Operator's content access rights. The UI allows for re-flowing the Console UI without reinstalling or updating the Console application, seamlessly integrating new content into the UI and targeting language to specific domains.

DETAILED DESCRIPTION

Definitions

Figure 1:
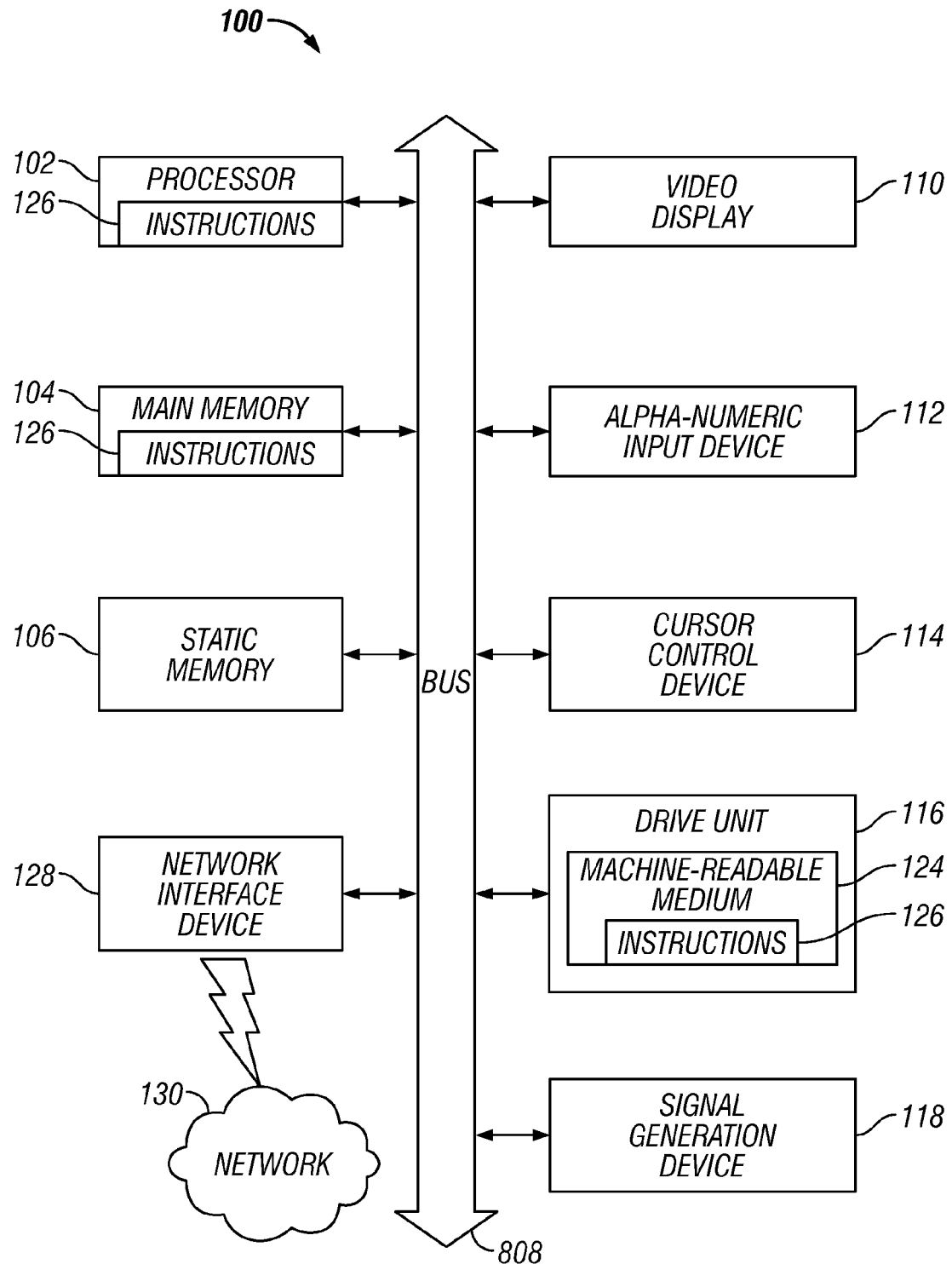
FIG. 1 provides a diagram of a machine in the exemplary form of a computer system within which a set of instructions, for causing the machine to perform any one of the methodologies discussed herein below, may be executed.

Action: actions are typically scripts that can customize a specific solution for each Client, using Relevance expressions. Although the Relevance language itself can't alter a Client, it can be used to direct actions in a way that parallels the original trigger. For instance, a Fixlet might use the Relevance language to inspect a file in the system folder. Using a similar Relevance clause, an Action associated with the Fixlet can then target that same file without knowing explicitly where that folder resides. This allows the Action author (and issuer) to concentrate on the issue at hand without worrying about the vagaries of each individual computer system.

Agent: Software that resides on Client and acts as a universal policy engine capable of delivering multiple management services. A single Agent can execute a diverse and extensible array of management services ranging from real-time Client status reporting, to patch and software distribution, to security policy enforcement. By assigning responsibility for reporting and management actions to endpoints themselves, the Platform enables visibility and management of IT infrastructures ranging from hundreds to hundreds of thousands of desktop, mobile and Server computers.

Client: an endpoint device in a network under management by a Platform for policy-driven communication and management infrastructure.

Console: an operations control center for administrators, that includes graphical displays of device, group, and enterprise-wide device status and dashboards for executing management actions through the infrastructure. The Console also includes reporting functions and templates that enable graphical and tabular views of infrastructure status.

Dashboard: Dashboards are content-defined UI elements that users interact with in the main window of the Console. Dashboards tap into the Platform Database to provide the Operator with timely and compact high-level views of the network. They use session relevance to access and display a subset of all data stored in the database. For example, the BES License and Inventory site contains the Application Usage Dashboard, which shows constantly updated statistics about various executables on client computers. Other Dashboards may report on the BES Deployment, or the status of Patch rollouts, for example.

Fixlet or Fixlet message: a piece of content included in sites that contains two major parts. First, a Fixlet contains relevance that assesses the status of the client with regards to specific questions, such as the version of a given file or the value of a given registry key. Secondly, a Fixlet contains an action definition that describes changes to be made on the endpoint. The relevance is evaluated on the client by the agent; console operators can create Actions from the Fixlet action definition, which are then distributed to targeted clients via the agent.

Relay: A Relay is a software module that executes as a shared service on non-dedicated hardware. Alternatively, "Relay" can refer to the hardware on which Relay software is running. Relays act as concentration points for Fixlet messages on network infrastructures and help reduce network bandwidth requirements for distribution of Fixlets and content such as software, patches, updates, and other information. Relays also offer a failover mechanism to keep managed Clients in touch with the Console should normal communications channels go dark or become overloaded with other traffic.

Relevance: a human-readable language for querying properties of the client. Relevance is evaluated by the agent on the client. Agents evaluate the relevance included in Fixlets and Analyses and report the results to the Server. The Console reports aggregated results of these Fixlets and Analyses to Console Operators. Relevance can also be used to customize and target Actions to the specific circumstances of the client. Thus one can feel confident that only broken machines are being fixed and that the rest are never bothered.

Session Relevance allows for the inspection of information stored in the System Database. Session relevance allows for the inspection of concepts beyond computer properties, such as properties associated with Sites, Operators, Fixlets, and Actions; for example, a Session Relevance expression can be written to return true if a specific piece of content (a Fixlet) is applicable on any computer on the network.

Server: Software that provides a control center and repository for managed system configuration data, software updates and patches, and other management information. In the alternative, "Server" can denote a computing machine running such software within a network under management.

Site: Sites are collections of Fixlet messages, Dashboards, Wizards, and other content to which an Operator of a Platform deployment may subscribe one or more Clients in the Operator's network. Sites may be created by the Platform manufacturer or by one or more third parties. Additionally, deployment Operators may create custom sites that contain internally generated content.

Wizards: Content that provides an interface for the creation of new Fixlet messages or settings. They generally involve a step-through question and answer interface.

Computing Environment

The invention operates within a computing environment. One embodiment of a suitable computing environment is described here.

Referring now to FIG. 1, shown is a diagrammatic representation of a machine in the exemplary form of a computer system (100) within which a set of instructions for causing the machine to perform any one of the methodologies discussed herein below may be executed. In alternative embodiments, the machine may comprise a network router, a network switch, a network bridge, personal digital assistant (PDA), a cellular telephone, a web appliance or any machine capable of executing a sequence of instructions that specify actions to be taken by that machine.

The computer system (100) includes a processor (102), a main memory (104) and a static memory (106), which communicate with each other via a bus 108. The computer system (100) may further include a display unit 110, for example, a liquid crystal display (LCD) or a cathode ray tube (CRT). The computer system (100) also includes an alphanumeric input device (112), for example, a keyboard; a cursor control device (114), for example, a mouse; a disk drive unit (116), a signal generation device (118), for example, a speaker, and a network interface device (128).

The disk drive unit (116) includes a machine-readable medium (124) on which is stored a set of executable instructions, i.e. software, (126) embodying any one, or all, of the methodologies described herein below. The software (126) is also shown to reside, completely or at least partially, within the main memory (104) and/or within the processor (102). The software (126) may further be transmitted or received over a network (130) by means of a network interface device (128).

In contrast to the system (100) discussed above, a different embodiment of the invention uses logic circuitry instead of computer-executed instructions to implement processing offers. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large scale integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like. It is to be understood that embodiments of this invention may be used as or to support software programs executed upon some form of processing core (such as the Central Processing Unit of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Unified Management Platform

An embodiment of the invention operates in the context of an enterprise management platform, as described in this section.

Figure 2:
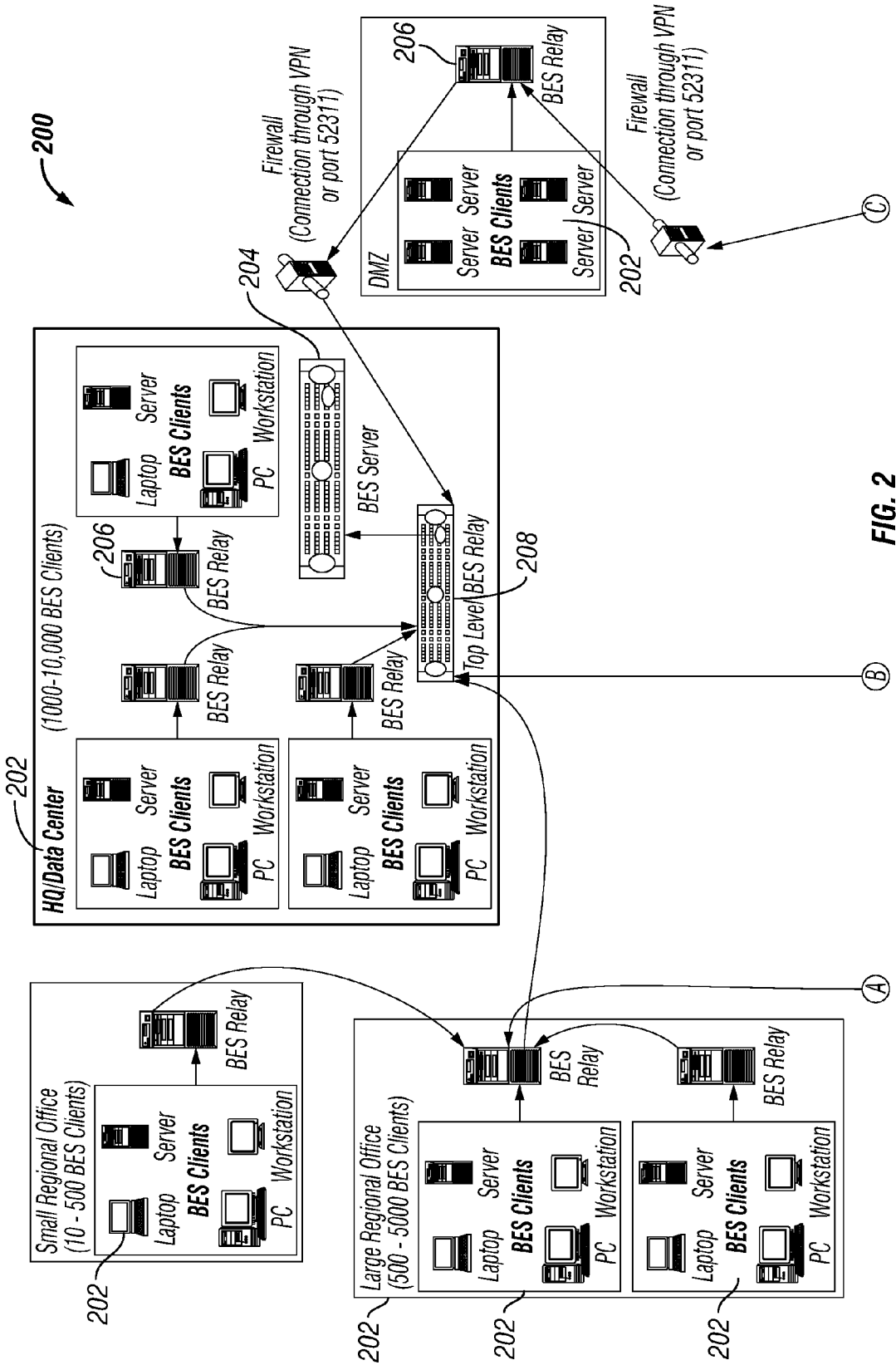
FIG. 2 provides a block diagram of a unified platform for policy-driven communication and management.
Figure 2:
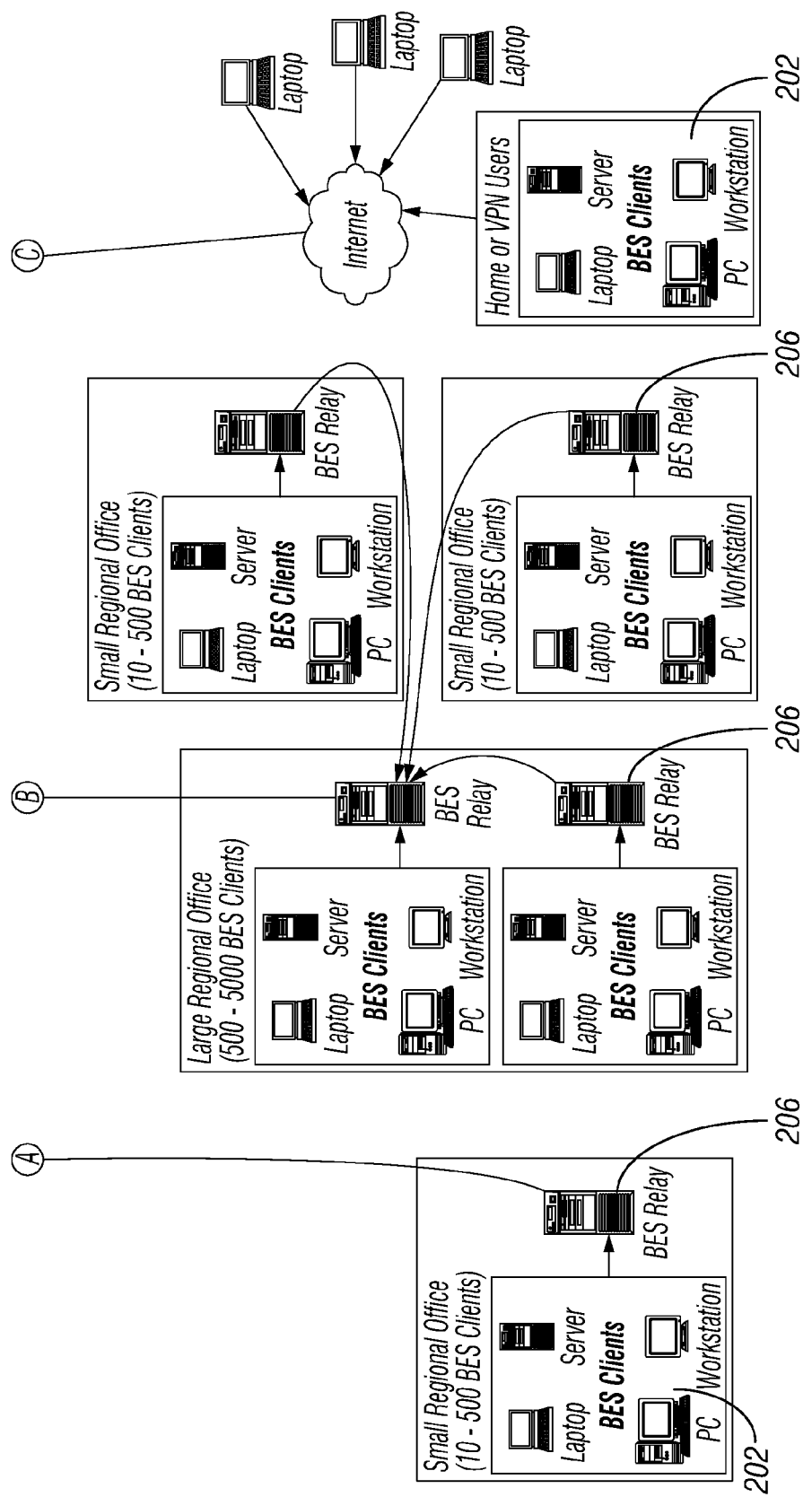

Referring now to FIG. 2, shown is a unified management Platform (200) for creating a policy-driven, communications and management infrastructure for delivery of security and management services to networked computational devices, such as desktop, laptop/notebook and Server computers. In an embodiment, components of the Platform may include at least one Client (202) running an Agent, at least one Server and Console (204), Fixlet messages (indicated by the arrows showing data flow between elements), and at least one Relay (206). In addition to the Relays (206), a Relay hierarchy typically includes a top-level Relay (208) that directly interacts with the Server (204).

Key components of the Platform include the Agent (202), the Server and Console (204), the Fixlet messages, and the Relays (206), (208). The Platform creates a lightweight communications and management infrastructure for delivery of security and system management services to networked desktop, laptop/notebook and Server computers. By assigning responsibility for reporting and management actions on endpoints themselves, the Platform enables visibility and management of IT infrastructures ranging from hundreds to hundreds of thousands of desktop, mobile and Server computers.

The Agent (202) resides on managed devices and acts as a universal policy engine capable of delivering multiple management services. A single Agent (202) can execute a diverse and extensible array of management services that range from real-time Client status reporting, to patch and software distribution, to security policy enforcement.

The Agent's role in the Platform may be described as that of a Policy Engine: a piece of software and a computational context for evaluating content. Thus, the Agent constitutes a computational resource that uses one or more inspectors to examine its context, decide what is relevant, report properties, take Action in that environment, and report on the success or failure of the actions. Thus, the Agent gives an administrator visibility into the context and controls it. The motivation for provision of a policy engine thus may be the realization that any computing resource, including physical or virtual machines, or a machine, that is a delegate for another machine or a piece of hardware can benefit from management by having a policy engine that can inspect properties of the entity that is being managed, apply changes to the environment and report on the fact that those changes were effective or not.

The Agent also automatically, notifies the Server and Console (204) of changes in managed device configuration, providing a real-time view of device status. In addition to a standard array of management services, customers and developers can create custom policies and services using a published authoring language. In various embodiments, the Agent runs on all versions of the MICROSOFT WINDOWS (Microsoft Corporation, Redmond Wash.) operating system since WINDOWS 95, UNIX, LINUX and MAC OS (APPLE, INC., Cupertino Calif.) Client systems, enabling administrators to consolidate management of heterogeneous infrastructures from the Console.

The Server (204) is a software-based package that provides a control center and repository for managed system configuration data, software updates and patches, and other management information. In an embodiment, the Console (204), provides an operations control center for administrators that includes graphical displays of device, group, and enterprise-wide device status and dashboards for executing management actions through the management infrastructure. The Console may also include reporting functions and templates that enable graphical and tabular views on infrastructure status.

Fixlet messages contain relevance based queries regarding client properties. These queries are interpreted by the Agent (202), and the results are reported back to the server. As noted above, in an embodiment, users have the option of writing custom Fixlet messages.

Relays (206), (208) act as concentration points for Fixlet messages on network infrastructures. Relays are a software module that execute as a shared service on non-dedicated hardware. Relays help reduce network bandwidth requirements for distribution of Fixlets and content such as software, patches, updates, and other information. In an embodiment, Relays (206), (208) include a failover mechanism to keep managed Clients in touch with the Console should normal communications channels go dark or become overloaded with other traffic. In an embodiment, Relays allow an N-tier hierarchy to be created for the transmission of information from the Clients to the Server in the enterprise.

The unified management Platform provides real-time visibility and control of IT systems through a. single infrastructure, single agent and unified Console. The Platform is designed to continuously discover, assess, remediate, and enforce the health and security of servers, desktops, and roaming laptops in real-time via a single policy-driven Agent and single Console. The aspects of IT systems that are evaluated and are determined in part by content on sites to which the Platform is subscribed. Sites can be distributed to the Platform by external entities, or created from within the Platform itself. Each site contains a variety of related content that can be evaluated by Agents installed on local systems. The Console aggregates data reported from clients on the local deployment. The Platform distributes content from a variety of Sites, ranging, for example, from operating system patching to power management to anti-virus. Each site contains a variety of content in different domains. Local deployments are subscribed to a given subset of sites, and Console users can have access to all or a subset of the deployment's Sites.

The Console interface described herein provides an overall structure for the presentation of subscribed sites. The sites include information regarding how their contents will be organized in the interface, from how individual documents are grouped together, to the language used to present content, to how different sites are combined into one top-level container, called a domain. This means that to a large degree, the Console interface is determined not by the local application but by the sites to which the user is subscribed.

Content-Driven Interface

Figure 3:
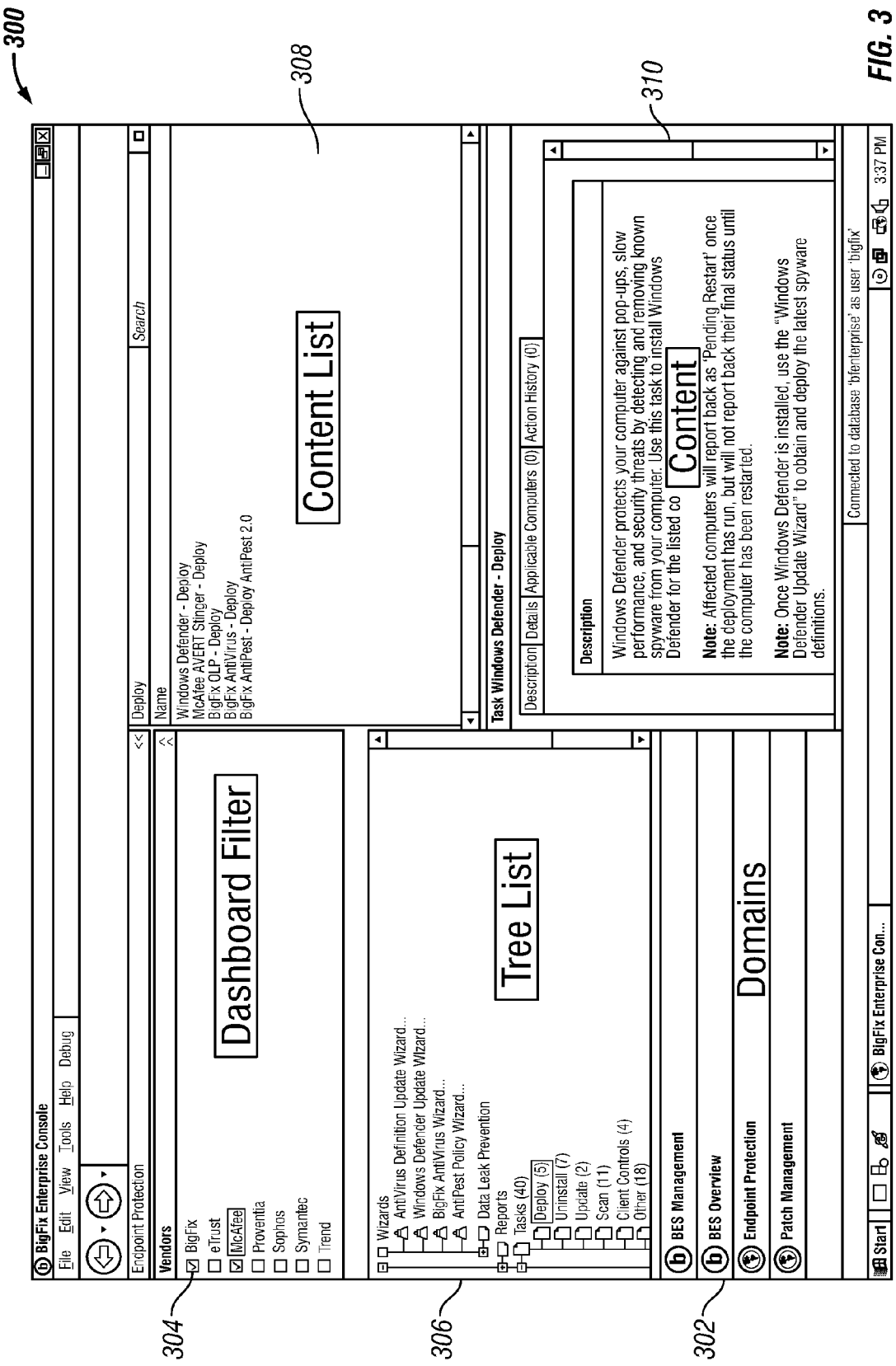
FIG. 3 provides a screenshot of a content-driven interface in the platform of FIG. 1.

FIG. 3 shows a screenshot of the Content-driven interface (300). The left half of the image shows the sections of the interface that are defined by content. Domains (302) are abstract containers for multiple sites. Selecting a domain in the lower-left of the interface displays the domain's Dashboard Filters (304) and Tree lists (306) in the upper-left of the interface. The layout, organization, and naming of these Dashboard Filters and Tree lists is defined by the specifications included with the content sites. Selections made in the Tree lists and Dashboard Filters drive the Content List (308) and Content Pane (310) located on the right side of the interface. The Content List displays lists of content, and the Content Pane displays details of individual pieces of content.

Domains (302) aggregate content from an arbitrary number of sites. Only sites to which the operator is given access are displayed in the console. Tree lists (306) are hierarchical organizations of the sites' contents. The naming and ordering of nodes in the Tree lists, as well as the elements contained by the nodes, are defined by content, not by the locally installed application. The Dashboard Filter (304), which is part of a site, allows for the further manipulation of the tree list. By means of a domain specification, sites (not shown) define the naming, ordering, and elements of each container in the Tree List, as well as how Tree lists and Dashboard Filters are arranged. Filters (e.g. "Tasks" as shown in the Tree list (306)) present content in the Content List. Folders (e.g. "Wizards" as shown in the Tree list (306)) present individual pieces of content or filters.

Figure 4:
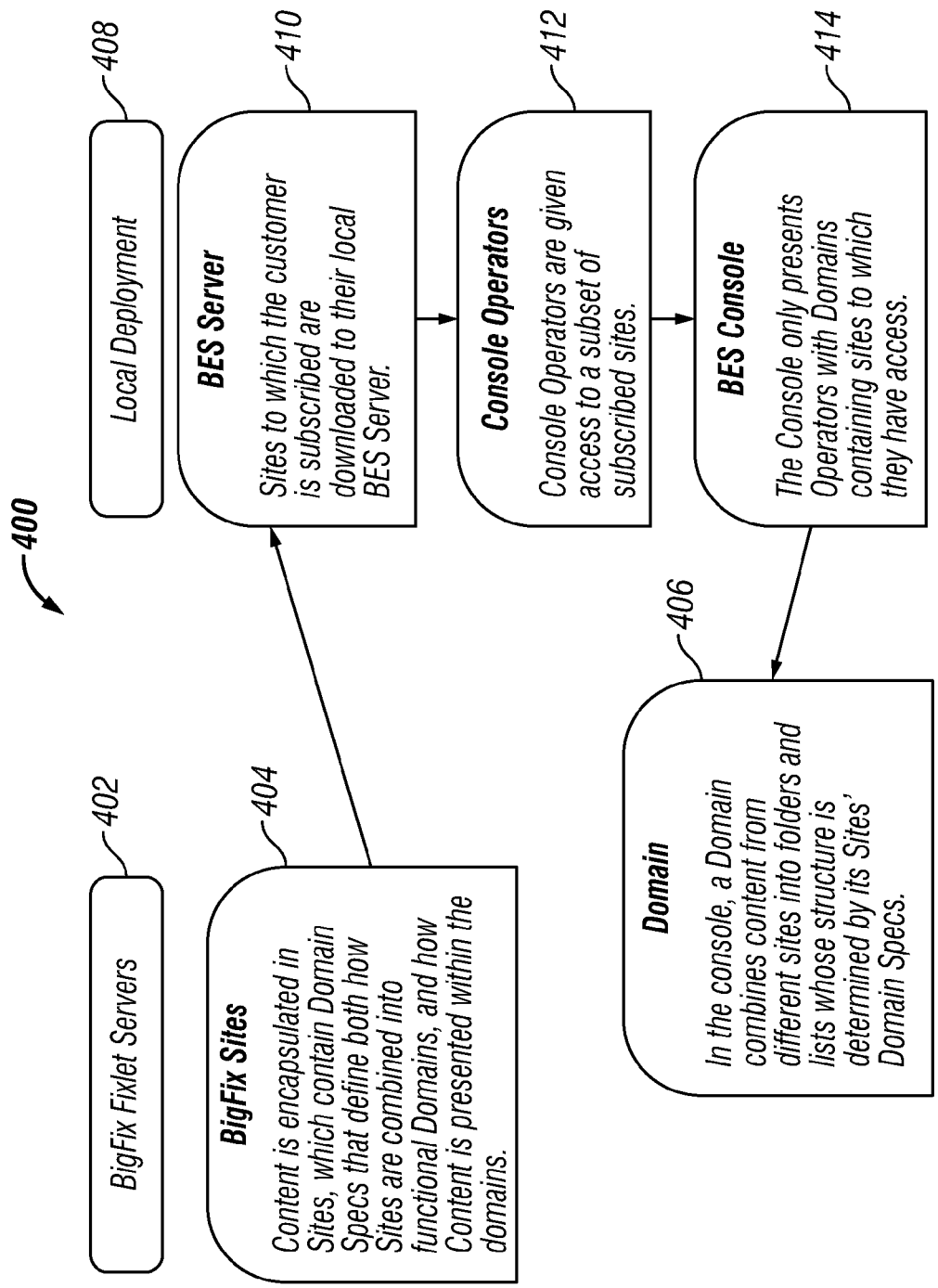
FIG. 4 provides a diagram of content flow in the platform of FIG. 2.

FIG. 4 represents an abstract schematic of the flow (400) of interface information. Fixlet Servers (402) outside the customer environment send out content sites (404) containing the domain specifications, which define both how Sites are combined into functional domains, and how the sites' Content is presented within the domains. In local deployments (408), a local server (410) is subscribed to a set of these sites. Sites to which a customer is subscribed are downloaded to the local server (410). Each Console Operator (412) is given access to a subset of subscribed sites, according to the Operator's profile. On the Console (414), a Domain combines content from different sites into folders and lists whose structure is determined by its Sites' domain specifications. The Console (414)

only presents Operators with Domains containing sites to which they have been given access.

Figure 5:
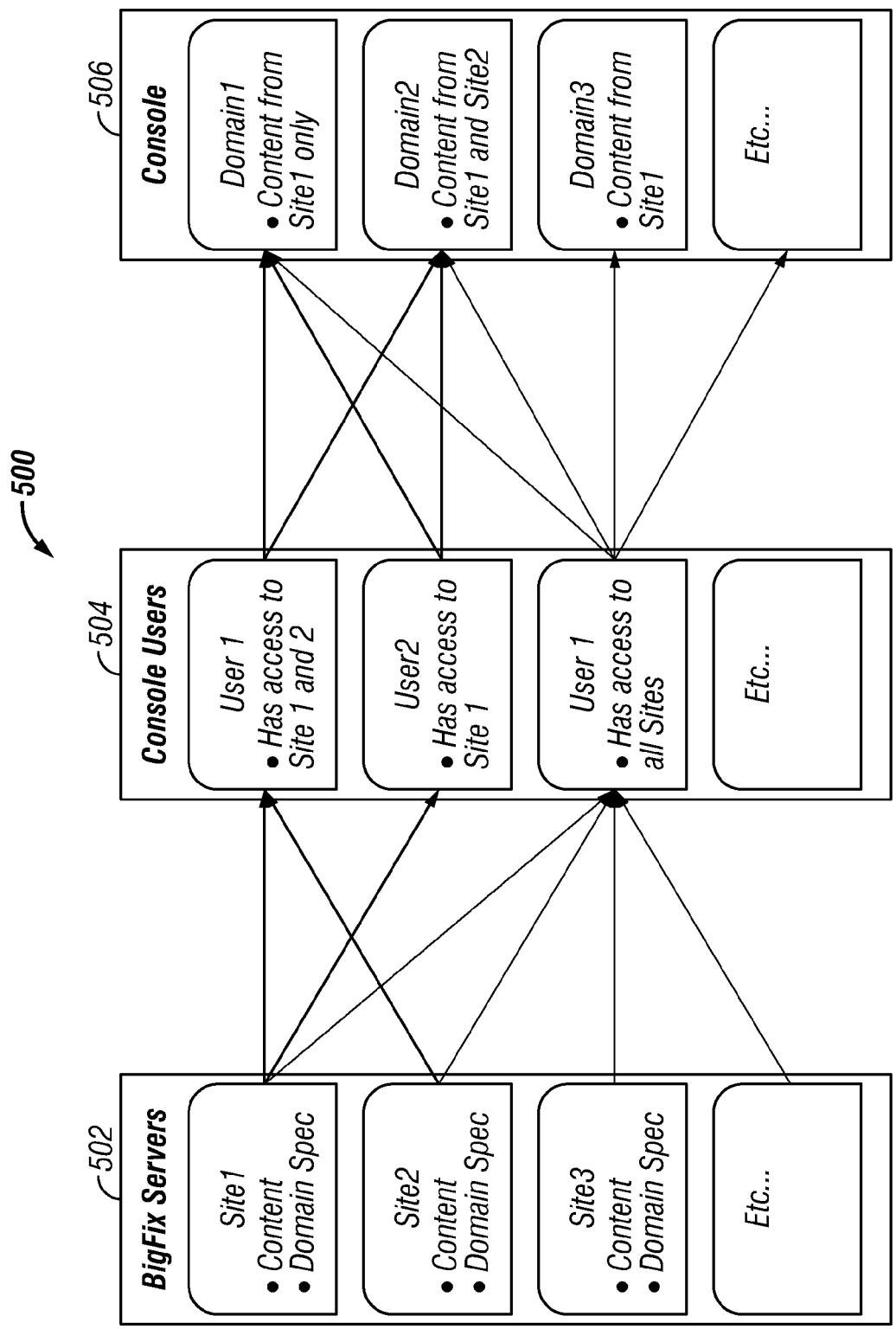
FIG. 5 provides a diagram illustrating how domain specifications from sites and users' site access permissions interact to produce the end-user UI experience in the platform of FIG. 1.

The Console UI an Operator views depends on the specific content to which the Operator has access. This means different operators on the same deployment will have different experiences when using the console. FIG. 5 shows a diagram (500) of how domain specifications from sites and users' site access permissions interact to produce the end-user UI experience. Sites define the UI of domains (502), and users (504) are given access to particular sites. In the Console (506), users only see domains that contain sites to which they have access. So each Operator sees a UI that is appropriate to the role the Operator has within their environment. Accordingly, a single UI can serve both, for example, the Chief Security Officer who wants to see the network's status relative to a set of compliance measures or the systems administrator who wants to see the network's status relative to the installation of operating system updates.

Figure 6:
FIG. 6 provides a diagram illustrating several ways a domain's interface could be organized based on the domain specification included with the content.
Figure 7:
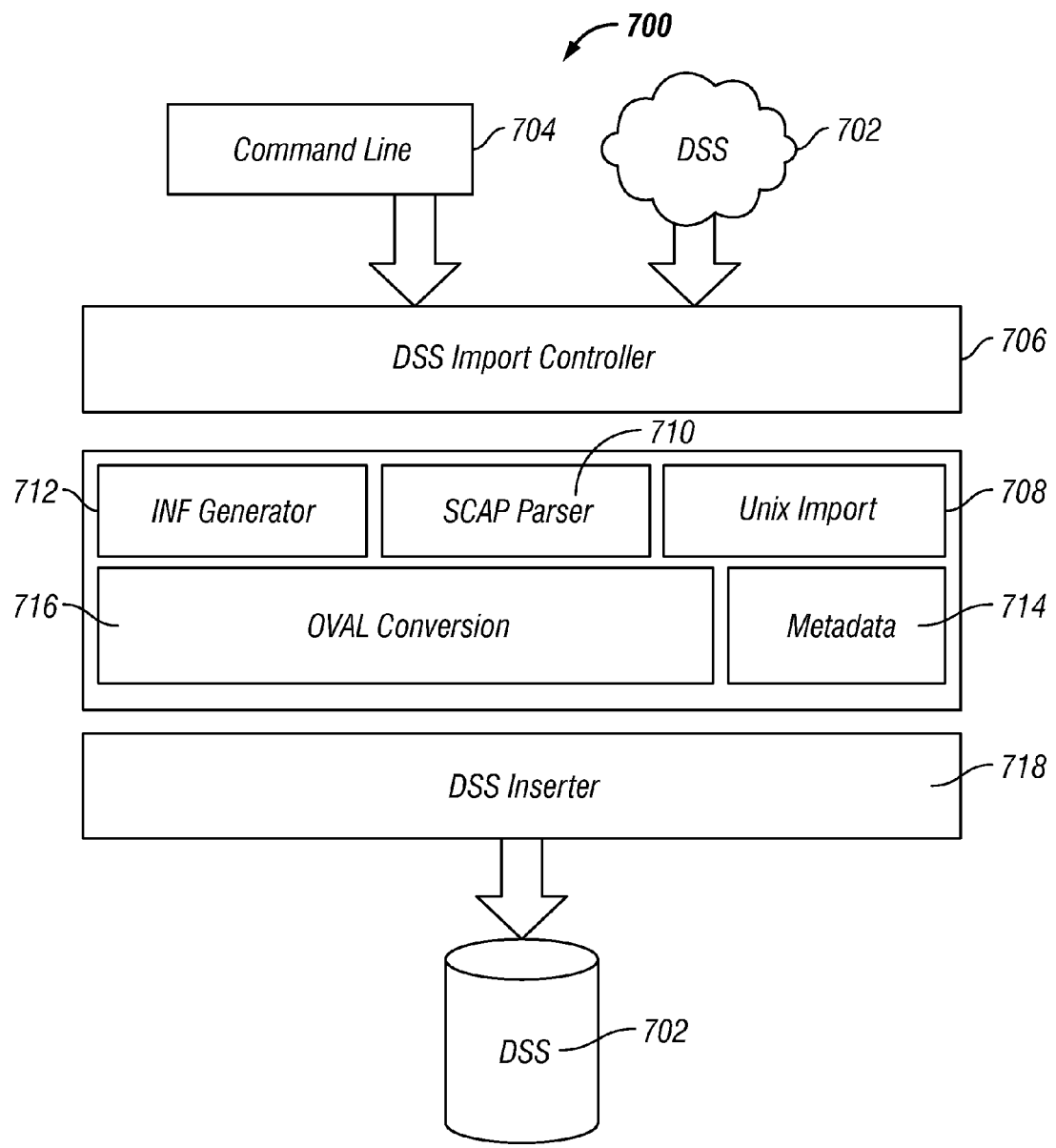
FIG. 7 provides a diagram of an import process in an automated content generator from the platform of FIG. 2.
Figure 8:
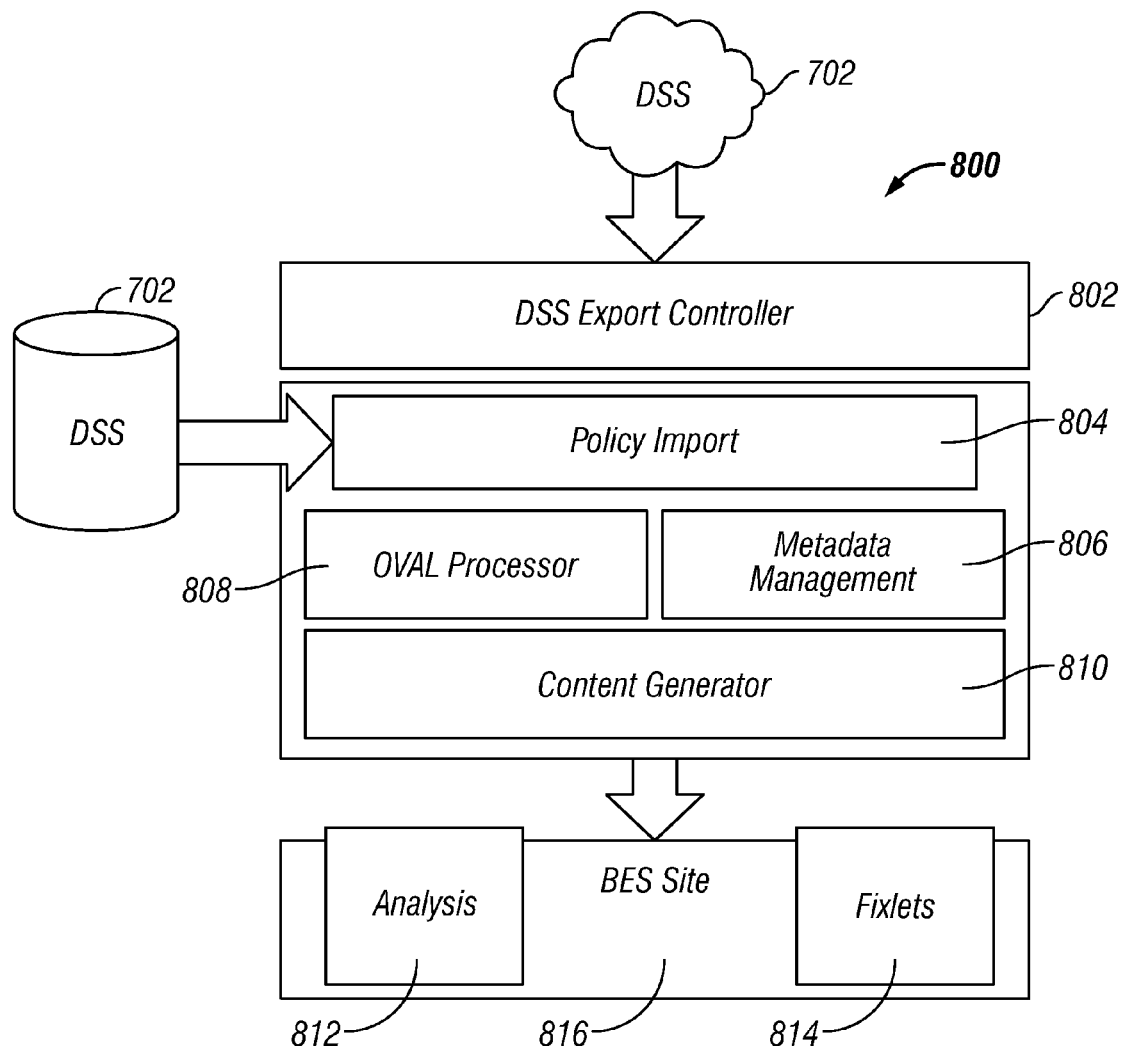
FIG. 8 provides a diagram of an export process in an automated content generator from the platform of FIG. 2.
Figure 9:
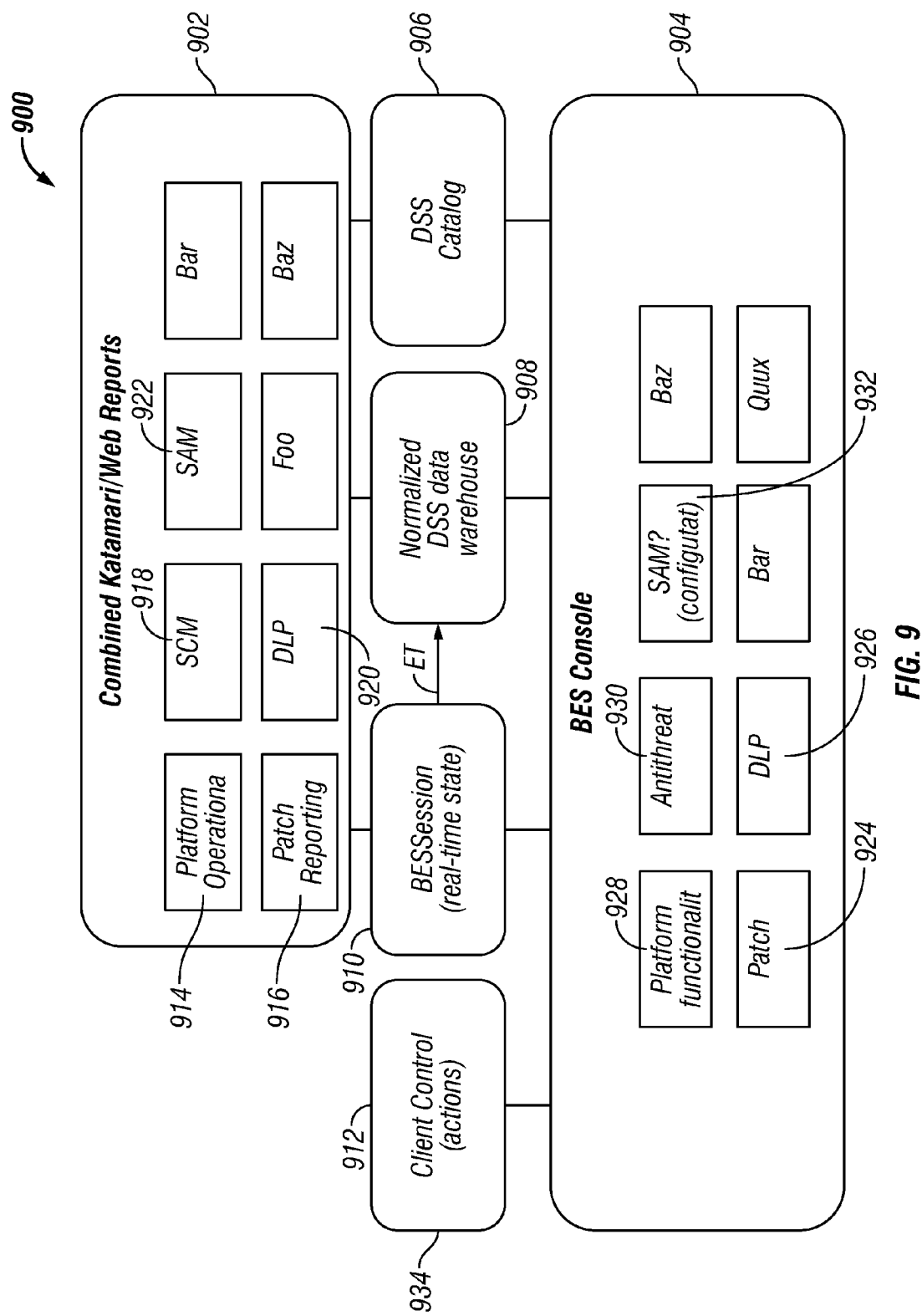
FIG. 9 provides a diagram of a reporting module from the platform of FIG. 2

Each domain provides language and user interface elements that map directly to that particular problem domain. Domains also allow for focusing the UI. An undifferentiated list of the Fixlets in a deployment can number in the tens of thousands. Domains can narrow that number to less than one hundred. FIG. 6 shows how a Tree List in an exemplar domain, "Patch Management", can be organized in several different ways according to the customer environment (600). This domain contains UI content related to operating system and application patches. In the Windows Only version (602) of the Tree List, the Operator would only see content related to Windows Patches. All nodes use language appropriate to Windows Operating Systems. For example, under the "Updates" folder, there is a node for "Rollups and Fixlets." An operator who is only responsible for updating Windows computers might see this view, as they are only subscribed to Windows content.

A second version of the Tree List (604) shows the view of an operator with access to both Windows and Red Hat patching sites. There is an evident difference in the number of security bulletins for example –24 37 vs. 2567. Another key difference to see here is that the "Updates" folder now has nodes with language specific to the Red Hat environment, such as "Redhat Enhancements." An operator responsible for patching both Windows and Red Hat operating systems might see this view.

The final version shows a Tree List using that does not use language that is specified to any specific operating system (606). This generic interface contains a greater number of Fixlets, indicating it is consolidating patches from additional operating system sites.

This exemplifies several key points. First, the UI is determined by the sites to which the user has access, and uses language that is appropriate to the tasks of the individual operator. Thus role-specific UIs are dynamically provisioned. Secondly, while the organization of 602 and 604 is distinct from the organization of 606, these differences are defined in the sites themselves, and can thus be changed dynamically without modifying the code base of the locally installed application.

The domain specification may be based, at least in part, on the notion of session relevance. Session relevance is used to describe both the contents of each node in the Tree list, as described above, and in determining whether or not a particular content type or a particular piece of content is displayed. The latter allows the UI to change, not only according to User and task, but also according to changes in a deployment.

For example, if a new type of computer shows up in a customer's deployment, in response, a new section of the Patch Management UI shows up. Thus, the UI customizes itself to the environment it finds itself in by examining characteristics of the deployment that is being interacted with.

It is apparent that these notions are applicable to all, or nearly all, domains, such as security configuration management and endpoint protection. So in that domain, one is interested in the conformance of all machines to a set of security policies such as password complexity, or perhaps, patch status or anti-virus status. Certain content types may fall into several domains, which can be achieved in this paradigm.

Content-Driven Interface Embodiment Notes

As noted above, the practice of relevance evaluation, which previously has been limited to Agents running on Clients, as first described in U.S. Pat. No. 6,256,664, now extends beyond the Agent. While earlier work is concerned with relevance in the context of a machine or properties of the network around the machine, as describe herein, relevance evaluation is now applied in the context of the Console and the context of deployment. Where previously decision making was performed on the endpoint by an Agent running on the endpoint, decision making is now distributed to Consoles in addition to Agents. One or more Domain Specifications are included with a content site. Each domain specification uses session relevance to describe the contents of each UI entity. The console interprets the domain specifications, and merges the definitions from multiple sites into a single coherent UI. Multiple sites can place contents in single containers, and individual sites can place content in nodes of multiple domains. Thus, as content comes in, it signals to the Console the circumstances in which it is relevant and how it should be presented to the user.

Properties and Data

The session relevance used by the interface paradigm described here inspects properties of the content distributed with the sites as well as properties associated with the clients, as reported by the agents. Some of these properties are inherent to the content itself, such as the severity value of a Fixlet, which is a part of the Fixlet itself. Others are based on reported values by many computers, for example the number of computers on which a specific Fixlet is applicable.

Session Relevance, described above, is used to query these properties and plays a large part in the definition of the interface by the sites' domain specifications.

Domain Specification

As above, a domain specification XML (eXtensible Markup Language) document is included with each site. This specification contains a section for each domain in which the site places content. The domain specification contains the information that fully describes how the site's contents should be presented within the UI. The domain specifications from sites to which the Operator has access are interpreted by the console.

Each domain is assigned a code that allows it to be recognized by the Console, a name the Console uses to display the domain, and an icon used to represent the name.

Domain specifications can define tree lists. These lists contain hierarchical nodes of a variety of types, such as folders, lists, and drill-down lists. The names of these nodes are defined in the specification, and the contents of each node are defined by means of session relevance. The domain specification may identify Dashboard Filters to be included in the interface. These are arbitrary HTML documents that can include session relevance, and are also distributed with the site This allows a variety of functionality. The dashboard can allow for further refining of the tree-list. For example, a checkbox in the dashboard could tell the tree-list to only present nodes and fixlets containing content relevant to Windows operating systems. The dashboard could also query the database to prominently display important information, for example out of date licenses.

Two additional important concepts are sort order and conditions. A numerical sort order value for each node describes the order in which it should be presented. Lower numbers are presented above higher numbers. These can be defined for nodes in the tree list. Sort order is also used to describe the order in which domains should be presented, and the order in which Tree Lists and Dashboard Filters are presented.

Conditions are relevance queries that allow the domain specification to define when it should and should not be presented in the interface. For example, a filter node may have a condition that only makes it visible when any of its content is relevant on any machine. Conditions can be used on any node in a tree list, as well as on dashboards.

To present an interface to the user, the Console must merge the domain specifications from the different sites. It does this by combining the definitions of each UI element that are included in the different domain specifications to which it is subscribed. Referring again to FIG. 6, in the Traditional Organization (606), the "Fixlets" container for example combines the contents of multiple sites. A domain specification from each site uses session relevance to define the site's contribution to the node. The console combines the contents from all sites into a single node. It only uses specifications from the sites to which the logged in operator has access.

Advantages

A major advantage of this UI paradigm is that the interface can be modified without changing the locally installed applications. This has a variety of benefits, including at least the following:

Arbitrarily combining information from multiple sources: Customers have multiple sources of information available to them in the form of sites produced outside their environment or ones produced by their own users. The paradigm presented here allows these disparate sources to be presented to users in a unified manner.

Seamless integration of new content: In this paradigm, new content can be integrated into the current interface in a variety of ways. If it is highly related to existing content, it can be automatically placed within nodes previously defined in the domain specification. If the new content provides additional functionality but resides within the same domain, a new node can be created in a tree-list. If the new content is completely new, a new domain can be created.

Rapidly Refreshing Interface: This paradigm allows for rapidly enhancing the interface without requiring customers to install new software. If improvements are made, the new domain specifications are automatically sent to the customer, whose Consoles immediately display the new interface.

Linguistic Specificity: As all language is defined outside the Console, the language presented to the user does not rely on any pre-set taxonomy. Instead it can be content-specific, addressing users' workflow. As new content is produced, appropriate organizational language can be sent along with the content itself.

Use Cases

Restricting view for newly subscribed content: When a customer has just subscribed to a site, there are often a restricted set of setup tasks that must be completed before they can benefit from the full functionality of the site. These setup tasks can be hidden among the large quantity of content distributed with the site. Using relevance queries, the domain specification can determine whether the site needs to be setup at the customer site. If it does, the domain can hide all non-related content, making it easier to find the appropriate setup content. It can also organize the setup content into easy steps.

Patching for different users: Patching of operating systems and software is one of the most powerful features of the Platform. Content may be split up across different Operating System sites, such as windows OS languages, RedHat Linux, and the like. The domain specs can be modified to target patching language, as shown in FIG. 5, example 502, or they can be written to organize content according to more generic Platform concepts, as in FIG. 5 example 504. Both examples can be distributed with the same content, and the user can select which one they want to see.

If users have limited access to sites, they will see a limited version of the Console. For example, if they only have access to one site, a dashboard filtering Windows and Linux sites could be hidden from the user as it would be unnecessary.

Content Factory Summary

The content-driven interface described above has substantial advantages in the case where all of the UI-defining content is supplied directly through sites external to the customer's deployment. However, a further refinement is possible.

In the content factory model, the content factory contains logic to dynamically generate content based on input supplied by the user. In addition to generating content, a domain specification can be created to define the UI within the console. This UI can rely on the structure inherent to the input stream. Thus, UI is automatically generated alongside new content without modifying the local application code.

As an example, a user might interact with a dashboard A to express requirements specific to their environment, and based on those requirements, a dashboard B might be generated which addresses those requirements. Dashboard B, which by itself is a dynamically generated UI, will then be placed in a tree list in the console by an automatically created domain specification.

The content factory might be traditional platform content, or it might be hosted in another environment, as described in the example embodiment below.

Decision Support System (DSS)

As background for the example Content Factory Embodiment discussed below, it is helpful to understand the BigFix concept of a Decision Support System.

In an embodiment, a decision support and reporting system (DSS) may include its own data warehouse, web interface, data connector and associated administrative functions, providing the ability to move easily from an executive level macro view of the entire environment through domain and role-specific lenses and into a granular view micro view of specific problem sets. The purpose is to add a level of decision support and intelligence on top of the abstracted data. The DSS includes federation and reconciliation functions that allow us to move beyond a particular data source, such as data from the unified management platform described above and to incorporate other areas of IT, such as network context, application and user provisioning.

Using the DSS, it is possible to convert data into meaningful information to support optimized systems and security operations and risk and compliance management for the enterprise, and additionally support federation and reconciliation of data.

Capabilities:

Data integration and normalization across computers that allows organization to integrate and correlate information silos;

Data warehouse that allows for trending/persistent store for reporting;

Providing comparative and trended information to empower enterprise management to be able to see, act and optimize their systems and security;

Framing aggregated information into specific views aligned w/ business, operations, risk, security and compliance environments;

Ability to drill down by various dimension for reports—in aggregate, by business unit, by asset, by geography class, or whatever is defined and required by the customer;

Ability to add business value parameters as to asset value, and network configuration context;

Ability to add information about current threat environment;

Ability to synthesize asset, vulnerability, and threat data into risk assessment and remediation policy;

Distilling complex granular information synthesized for domain and role-specific consumers; and Dashboard capable of delivering unified, real-time visibility and control.

Accordingly, the DSS gives high-level analytics of any systems management situation. Thus, an existing platform such as the unified management platform described above gives a real time live view of what's going on in the enterprise and the ability to control it. DSS then takes that information and builds on top of it an analytics layer.

DSS has a data warehousing capability and a Web application stack capability married with a data feed, such as a unified management platform described above data feed and the practice of having domains flow down to the customer's deployment in content.

Thus, rather than it being a traditional, central software service model, it is out at the endpoint with applications that flow down from a central server into their environment to actually sample the properties of the environment, such as actual properties of machines, for example, the fact that there's a file named Excel.exe that's sitting on a certain machine in a certain location with certain properties, like a version number and a date that it was created.

Taking such raw information and then being able to process it into a form that is consumable by somebody who wants to understand what sets of software they've purchased and where it exists in their environment requires a complex process to figure out, for example, that someone purchased a version of Microsoft Office that included that executable with those properties and installed it on a particular machine.

Since the foregoing constitutes automatic creation of policies, it can also automate creation of all the content that a particular domain needs, as described herein below. Such automated content creation may include the domain specification and how the UI should look, being incorporated into a tool that allows, for example, a high-level person or a person who is not an operations person or even someone who knows what the platforms are, to create a description of what they want, do little more than push a button, and that specification flows, with the appropriate UI and workflow, to each person in the operations chain who needs to be involved. It is not just policies for the endpoint. It can be polices for the Console, it can be appropriate reports in other reporting environments. It can be that entire content stream.

Example Content Factory Embodiment

An example embodiment of a content factory addresses the use case of Systems and Configuration Management against third-party security standards. In this use case, a non-operational user needs to review an enterprise security and compliance posture against published third party standards, and make policy decisions based on that information. Those policy decisions are translated into generated platform content according to the content factory model, resulting in new, dynamically generated UI components being presented to the Console operator.

In this embodiment, types of supported inputs include at least:

SCAP (Security Content Automation Protocol) XML Stream;

INF (Setup Information File) Export from a Microsoft Windows Domain Policy/Computer Policy;

Unix Script Library; and

Custom Defined OVAL (Open Vulnerability and Assessment Language) Definitions.

The process is broken down into separate phases, for example:

Import of a standard into DSS; and

Export of BigFix Fixlet Messages from DSS into BES.

Import Summary

In an embodiment, a tool in the unified platform imports content from arbitrary streams directly into the platform, translating the streams into Fixlets, Analyses, and Specifications that describe how the content should be presented in the Console UI.

In another embodiment, the import process (700) may be called by DSS (702) or run stand-alone command line (704). It will accept a variety of inputs based on the format of the content to import. For INF imports, a metadata content file is usually available. To ease the import process, a DSS catalog Operator may match checks up to an internal ID before import using some UI in DSS. The process works by the following flow:

Controller calls for import (706):
  Type of Import:
    INF (712)
      Load Metadata;
      Load INF;
    SCAP Parser (710)
      Resolve XCCDF Document;
      Iterate over defined and selected Rules;
      Attach OVAL to Rule Definitions and simplify OVAL;
    Unix Importer (708)
      Load Unix script library;
      Convert to custom XML Namespace*;
      Attach Metadata;
    Raw OVAL (716)
      Load Metadata (714);
  Attach defined checks to existing control definitions if possible using a Metadata management library; and
  Insert specific metadata for standard; and
  Call OVAL Processor to generator OVAL; and
  Call DSS Inserter (718) to insert OVAL definitions.

Export Summary

In this embodiment, the export process (800) may be called from DSS (702) to the SCM Export Controller (802). The controller reads in the defined policy (804) from the DSS (702) database and pulls out all required information to create content. There exist several types of content created with options on some of the content, for example:

Per policy:
  Analysis (812)
    The analysis created returns the values for the controls only;
    The targeting of the analysis is may be to all computers managed by the policy in question;

Fixlet Message (814)
  The Fixlet Messages may have options for including remediation or not;
  Each Fixlet may have its Relevance contained within a constraining relevance statement determined by the targeting, done by DSS.

In this embodiment, during the generation process the controller script may verify whether or not a policy has been propagated before, if so it may update the existing content. The controller script can also be used to remove a policy if desired.

The export process is as follows:
  Export Controller (802) called by DSS (702);
  Controller reads in policy (804) information;
  Loads targeting information for the policy;
  Loads controls:
    Loads metadata (806) for each control;
    Generates relevance from loaded OVAL;
    Applies targeting relevance to check relevance (808);
    Verify whether or not this policy has been propagated before;
    Build Fixlet objects with relevance and description metadata; and
    Insert new policy objects (Fixlets, analyses) into site (816) per policy.

Script Functional Details

INF Generator Script: This script processes INF files that have been exported from a Windows Domain or Local Policy. It reads from CONFIG.INI which defined the many options related to each of the different operating systems. This script processes the INF file by section, and loads an appropriate module per section. That module creates relevance from the items within that section.

The metadata for this script is stored in INI file format, which may be loaded along with the INF file during the import process.

Modifications Script: This script may be modified by making a different branch of modules. The new modules, instead of generating relevance, generate OVAL definitions.

In an embodiment, the default INF format may be extended to include an Extern section which reads information in from an XML file for the check.

SCAP Parser Script: In an embodiment, this script processes a folder containing an SCAP XML (eXtensible Markup Language) stream. It processes an XCCDF (eXtensible Configuration Checklist Description Format) document according to standard and resolves the document to a profile defined inside the document. When the list of selected Rules have been determined it then loads up the OVAL objects related to each rule and creates relevance from those OVAL definitions. The metadata from this script is acquired directly from the XCCDF document.

Unix Importer Script: In this embodiment, this script may receive the location of the Unix scripts and operating system, then build an index of all of the controls covered, after which, associated metadata may be inserted. The information may be stored in an XML namespace of, for example, bigfix-scm-unix. The output may be OVAL. In an embodiment, the OVAL output may be extended by other namespaces.

Oval Processor Script: The OVAL Processor has at least two uses:
  verifying internal OVAL and simplifying it; and
  export relevance from the OVAL definitions created.

Because the OVAL definitions in SCAP are needlessly complex, on import, the script simplifies the definitions considerably.

The export portion may include modules defined for the entire OVAL standard. This portion of the script generates certain QA-specific files for testing.

Each of the modules defined may relate to an OVAL object type, i.e. fileeffectiverights54_object. The module may receive the raw XML as an input and return relevance that evaluates true if the conditions are met and false if they are not. This logic may be inverted when inserted into a Fixlet in order to make writing the relevance easier and the testing clearer.

Metadata Management Library: In this embodiment, a metadata management module is not a script, but a library. This may control what metadata gets imported and exported from DSS and how it is represented in the Fixlet. In an embodiment, it is library in which the inputs are the DSS database or a standardized representation of all the variables and data associated. In the case of parameters the format may be XSD (XML SCHEMA Document).

DSS Inserter Script: In this embodiment, the DSS inserter may harness database code from the DSS Rails application to insert the data from the OVAL Processor and Metadata Management module. An embodiment includes code logic to detect if the control has already been defined, or whether a new internal control ID should to be established.

Content Generator Script: In this embodiment, this is the script that actually creates the different kinds of content in BES. This script may load OVAL definitions via the Rails framework, and load metadata via the Metadata management library. It receives an input of a policy, and some options (for example, defined in the policy itself) to determine whether it is creating an analysis, Fixlets with remediation or Fixlets without. It may use some executable delivered from Platform like the PropagateFiles.exe used in the Trend content to create content. This script generates relevance from the OVAL definitions and creates Fixlets by combining that and the Metadata. The script also gathers targeting information from DSS and creates constraint relevance that encapsulates the actual check relevance. The analysis it creates has constraint relevance as the analysis relevance and is not in each property.

Illustrative Spirit of Description

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

The invention claimed is:

1. In a unified network management platform, a process for modifying a user interface in real time without changing locally-installed applications comprising;
  receiving, at a console, a plurality of content streams from a server for a plurality of content sites to which a user of the console subscribes, wherein each content site provides a domain specification strictured document containing presentation information for each domain in which the content site places content, the presentation information describing how content is to be presented within a domain in a user interface based on relevance information;
  determining, by the console, which of the plurality of content sites have relcv to current conditions of use based on the relevance information;
  creating, by the console, a distinct interface tailored to each relevant content site based on the current conditions and the domain specification structured documents received from the plurality of content sites; and dynamically merging, by the console, the distinct interfaces into a common interface such that the pity, of content streams are presented to the user in a unified manner in at least one domain based on the domain specification structured documents, wherein the at least one domain is a container aggregates content from the plurality of content streams.

2. The process of claim 1, wherein each content site comprises a collection of related content distributed to subscribed entities.

3. The process of claim 1, wherein said conditions of use comprise at least one of:
a user's identity;
a user's access level
a task; or
a network environment.

4. The process of claim 1, further comprising at least one of:
said Console integrating new content into a current interface by placing said new content within nodes previously defined in a domain specification;
said Console integrating new content that provides added function into an existing domain in a new node of a tree list; or
integrating new content into a newly-created domain.

5. The process of claim 1, further comprising:
said platform automatically distributing a new domain specification structured document to a subscribed user; and
in real-time, said Console updating the interface to reflect the new domain specification structured document.

6. The process of claim 1, comprising:
displaying at least one Dashboard filter in the user interface, wherein the dashboard filter is defined by information from at least one content site;
displaying at least one Tree List in the user interface, wherein the Tree List is defined by information from at least one content site;
displaying at least one Content List in the user interface, wherein the Content List is driven by selections in the at least one Tree List; and
displaying at least one Content Pane in the user interface, wherein the Content pane displays content from the Content List or the Tree List.

7. The process of claim 6, further comprising:
said Tree list providing containers for Content, content including one or more of and Folders.

8. The process of claim 1, further comprising:
displaying in the user interface content that is automatically aggregated or generated by a decision support system (DSS).

9. The process of claim 1, wherein the server is a laical server that is local to the console and wherein the local server subscribes to the plurality of content sites and downloads the plurality of content streams to the local server.

10. The process of claim 1, wherein each domain specification structured document comprises an extensible markup language document.

11. The process of claim 10, wherein each domain specification. structured document contains a section for each domain in which the corresponding content site places content.

12. A computer program product for modifying a user interface in real time without changing locally-installed applications comprising in a unified network management platform comprising a tangible, computer-readable non-transitory storage medium having computer-readable instructions embodied thereon for:

receiving, at a console, a plurality of content streams from a server for a plurality of content sites to which a user of the console subscribes, wherein each content site provides a domain specification structured document containing presentation. information for each domain in which the content site places content, the presentation information. describing how content is to be presented within a domain in a user interface based on relevance information;

determining, by the console Which of the plurality of content sites have relevance to current conditions of use based on the relevance information;

creating, by the console, distinct interfaces each is distinct interface being tailored to a respective relevant content site based on the current conditions and the domain specification structured document received from the plurality of content sites; and dynamically merging, by the console, the distinct, interfaces into a common interface such that the plurality of content streams are presented to the user in a unified manner in at least one domain based on the domain specification structured documents, wherein the at least one domain is a container that aggregates content from, the plurality of content streams.

13. The computer program product of claim 12, wherein each content site comprises a collection of related content distributed to subscribed entities.

14. The computer program product of claim 12, wherein the platform automatically distributes a new domain specification structured document to a subscribed user and in real-time, the console updates the interface to reflect the new domain specification structured document.

15. The computer program product of claim 12, wherein the console displays at least one Dashboard filter defined by information from at least one content site, at least one Tree List defined by information from at least one content site, at Least one Content List driven by selections in the at least one Tree List, and at least one Content Pane that displays content from the Content List or the Tree List.

16. The computer program product of claim 12, wherein the user interface displays content that is automatically aggregated or generated by a decision support system (DSS).

17. The computer program product of claim 12, wherein the server is a local server that is local to the console and wherein the local server subscribes to the plurality of content sites and downloads the plurality of content streams to the local server.

18. The computer program product of claim 12, wherein each domain specification structured document comprises an extensible markup language document.

19. The computer program product of claim 18, wherein each domain specification structured document contains a section for each domain in which the corresponding content site places content.

20. In a unified network management platform, an apparatus for modifying a user interface in real time without changing locally-installed applications comprising:
a processor; and
a memory coupled to the processor, wherein the memory comprises instructions which, when executed by the processor, cause the processor to:
receive, by a console, a plurality of content streams from a server for a plurality of content sites to which a user of the console subscribes, wherein each content site provides a domain specification structured document containing presentation information for each domain in which the content site places content, the presentation information describing how content is to be presented within , domain in a user interface based on relevance information;

determine, by the console, which of the plurality of content sites have relevance to current conditions of use based on the relevance information;

create, by the console, distinct interfaces, each interface being tailored to a respective relevant content stream based on the current conditions and the domain specification structured documents received from the plurality content sites; and dynamically merge, by the console, the distinct interfaces into a common interface such that the plurality of content streams are presented to a user in a unified manner in at least one domain based on the specification structured documents, wherein the at least one domain is a container that aggregates content from the plurality of content streams.

21. The apparatus of claim 20, wherein each content site comprising a collection of related content distributed to subscribed entities.

22. e apparatus of claim 20, wherein said conditions of use comprise at least one of:
   a user's identity;
   a user's access level
   a task; or
   a network environment.

23. The apparatus of claim 20, wherein the instructions further cause the processor to:
   integrate new content into a current interface by placing said new content within nodes previously defined in a domain specification;
   integrate new content that provides added function into an existing domain in a new node of a tree list; or
   integrate new content into a newly-created domain.

24. The apparatus of claim 20, wherein the instructions cause the processor to:
   automatically distribute, by the platform, a new domain specification structured document to a subscribed user; and
   update, in real-time, the interface to reflect the new domain specification structured document.

25. The apparatus of claim 20, wherein the instructions further cause the processor to display:
   at least one Dashboard filter in the user interface, wherein the dashboard filter is defined by information from at least one content site;
   at least one Tree List in the user interface, wherein the Tree List is defined by information from at least one content site;
   at least one Content List in the user interface, wherein the Content List is driven by selections in the at least one Tree List; and
   at least one Content Pane in the user interface, wherein the Content pane displays content from the Content List or the Tree List.

26. The apparatus of claim 25, wherein the instructions further cause the processor to:
   provide containers for Content in said Tree List, content including one or more of Tasks and Folders.

27. The apparatus of claim 20, wherein the instructions further cause the processor to:
   display in the user interface, content that. is automatically aggregated or generated by a decision support system (DSS).

28. The apparatus of claim 20, wherein the server is a local server that is local to the console and wherein the local server subscribes to the plurality of content sites and downloads the plurality of content streams to the local server.

29. The apparatus of claim 20, wherein each domain specification structured document comprises an extensible markup language document.

30. The apparatus of claim 29, wherein each domain specification structured document contains a section for each domain in which the corresponding content site places content.

* * * * *